United States Patent [19]

Larsson

[11] Patent Number: 4,844,350

[45] Date of Patent: Jul. 4, 1989

[54] APPARATUS FOR PROCESSING AN ELASTOMERIC PRODUCT

[75] Inventor: Gösta Larsson, Värnamo, Sweden

[73] Assignee: Jochnick & Norrman Press AB, Värnamo, Sweden

[21] Appl. No.: 734,208

[22] Filed: May 15, 1985

[30] Foreign Application Priority Data

May 16, 1984 [SE] Sweden .................... 8402643

[51] Int. Cl.⁴ .............................. B02C 18/40
[52] U.S. Cl. .................... 241/163; 241/261; 241/DIG. 31
[58] Field of Search ........... 241/260.1, 261, 162, 241/163, DIG. 31; 366/292, 301; 425/204

[56] References Cited

U.S. PATENT DOCUMENTS 1,928,052  9/1933  Fraser .................... 241/163
3,806,050  4/1974  Cumpston, Jr. ........ 241/261 X
4,284,247  8/1981  Eriksson ............... 241/261 X

FOREIGN PATENT DOCUMENTS 0062017 10/1982  European Pat. Off. .
  37828 12/1886  Fed. Rep. of Germany ...... 241/261
2905443  9/1979  Fed. Rep. of Germany ... 241/260.1
 117097  8/1918  United Kingdom .
 638364  6/1950  United Kingdom .

Primary Examiner—Mark Rosenbaum
Attorney, Agent, or Firm—Pollock, Vande Sande & Priddy

[57] ABSTRACT

Apparatus for processing elsatomeric material, comprising two shafts mounted for rotation in a housing in end bearings and carrying therebetween two gear pairs in cavities in the housing. A channel connects the gear meshing side of the first gear pair with a space adjacent the second gear pair centrally opposite the gear meshing sides thereof. The elastomer is taken in through openings adjacent the first gear pair, and is pumped through two gear pumps connected in series, and discharged from the pressure side of the latter located at the gear meshing point thereof.

4 Claims, 3 Drawing Sheets

APPARATUS FOR PROCESSING AN ELASTOMERIC PRODUCT

FIELD OF THE INVENTION

The invention relates to a machine for processing an elastomeric product, for example rubber, comprising a housing in which there are mounted two mutually parallel shafts each provided with mutually opposing and meshing gears arranged in a first space in the housing; an inlet opening through which an output product is introduced into the spaces between gears and housing; and guide channel means for guiding away elastomeric products passed through the teeth interspacing into tooth engagement.

BACKGROUND OF THE INVENTION

Machines of this kind, which operate in a manner reminiscent of gear pumps, formed part of the art since the time of the first World War. Exemplary in this respect is British Patent Specification No. 117,097, which discloses two pairs of gears, two on each shaft, arranged axially in side-by-side relationship with a groove therebetween through which there is introduced a cable which is then coated with rubber advanced through gear pumps on each side thereof.

In material processing machines of this kind, an elastomer is initially introduced as cut portions into the teeth interspaces, where the tips of the gear teeth slide against the inner wall of the housing, and carried forward to the tooth engagement, where treatment of the elastomer first commences. In order to work the elastomer more thoroughly, and to obtain improved sealing conditions, applicant has previously proposed the use of gears which are provided centrally with radial grooves into which a tongue projects in a direction opposite to the direction of rotation. This is described in European Patent Specification No. 81850055,3/0062017. In this way, the pressure created where the teeth of the gears meet, or the tooth meshing point, will be propagated backwards via the radially extending grooves, to sealing devices inserted therein. The sealing devices, and also the tongue, can be adjusted to control leakage, thereby enabling control of the extent to which the elastomer is worked.

OBJECT OF THE INVENTION

The object of the present invention is to provide on the basis of said gear pump principle a processing or treatment machine which will work and/or masticate the elastomer more thoroughly, to achieve a higher degree of vulcanization before the processed elastomer is discharged, for example, to a mold, and extrusion nozzle or similar device. This can be achieved by connecting a plurality of "gear pumps" sequentially in series, as described in British No. 838,364.

It is, however, a particular object of the invention to enable such series connection to be achieved without the external dimensions of the machine becoming excessive, and to enable problems relating to power transmission to be readily overcome. Instead of arranging a plurality of gear pumps with mutually parallel shaft pairs adjacent one another, there are arranged in accordance with the invention two shafts having a plurality of pairs, e.g., two pairs, of mutually meshing gears. More specifically, the objects of the invention and advantages afforded thereby are achieved with a machine of the kind described in the introduction, in which there are arranged on both of the aforesaid shafts further gears which are axially displaced and mounted in a second space in the housing, and in which there is provided between the first space in said housing and the second space therein a channel which forms an angle with the plane common to said shafts and intersects the plane at a point located therebetween, and in which channel means for guiding away the elastomeric products are arranged in the vicinity of the last gear mesh point in the machine as seen in the direction of transportation of the elastomeric product.

The two shafts need only be journalled in the housing at the ends thereof, thereby halving the number of bearings required for two gear pairs in comparison with two mutually connected gear pumps each having two shafts. This advantage becomes more apparent when more than two gears are arranged on each shaft, since with three mutually connected gear pumps according to the invention there are still only required four bearings. In this case each of the gear pairs is required to be placed in a respective space in the housing and an oblique channel of the aforesaid kind to be provided between the first and the second space and a further oblique channel between the second and the third space. The system can be expanded still further without needing to increase the number of bearings. In order to reduce leakage towards the shaft ends carrying the bearings, the gear teeth on the outermost gears on the two shafts are suitably angled, with the tooth angle arranged so that the mesh point of each tooth begins on the side facing respective bearings on said shaft ends. With this in mind the remainder of the teeth may be straight, bevelled, helical and/or herringbone. Although not a requisite feature of the invention, it is preferred to use gears having center grooves into which tongues and dividing and sealing devices project in the manner described in the above-mentioned European Patent Specification No. 82850055.3/0062017.

The two shafts and associated gears are suitably each produced as a one-piece integral component, one shaft being made longer than the other so as to extend from the housing for connection to a suitable drive motor.

The housing is suitably constructed so that it can be varied along a plane which coincides with the plane of the symmetry axes of the shafts. An advantage is also afforded when the housing can be parted along a plane extending at right angles to said axes. In the case of a machine which incorporates two gear pairs, the housing suitably comprises five parts as seen in the axial direction, namely two end parts for accommodating the bearings, a housing part adapted for each respective gear pair, and a channel part located between the two gear pair housing parts. The channel part may comprise a splittable, elongated rectangular housing part in which the channel is formed by the insertion of suitable wedge-like members. The various housing parts are held together by means of elongated tension rods in the axial direction, and by means of transverse tension rods as concerns the center plane division.

Suitably, both the housing and the shafts are provided with passages for heating or cooling purposes, depending on the process to be carried out. For example, in the case of polymers which are to be vulcanized or treated in a like manner, an output temperature of, e.g., 110° C. in respect of the product is often desired. The temperature control loops incorporated in the shafts can be arranged via known so-called swivel connections. The one shaft can be made accessible from two directions, while the other, driven shaft is normally made accessible solely from the non-driven end thereof. The channel part thus incorporates the channel connecting the two gears of the rear pump mounted on the common shaft pair.

BRIEF DESCRIPTION OF THE DRAWINGS

The invention will now be described in more detail with reference to an exemplary embodiment thereof illustrated in the accompanying drawings.

As shown in FIGS. 1 to 4, mounted in a housing 1 are two shafts 2 and 3, each carrying a respective gear 4,5 and 4',5'. The ends of the shafts are journalled in roller bearings 6, and one of said shafts extends from the housing 1 and exhibits a keyed or splined drive end (not shown). The gears mesh with one another in pairs, and in the illustrated embodiment are provided in a known manner with grooves 7 into which tongues 8 are inserted from one side, directed toward the point at which the gears mesh with one another. Arranged at other peripheral locations for insertion into the groove 7 are separate dividing and/or scraping devices 9,9'. The settings of the tongues can be adjusted with the aid of a screw mechanism. The principal design hereof is shown in FIGS. 5 which illustrates a prior art construction incorporating solely one gear pair.

Figure 1:
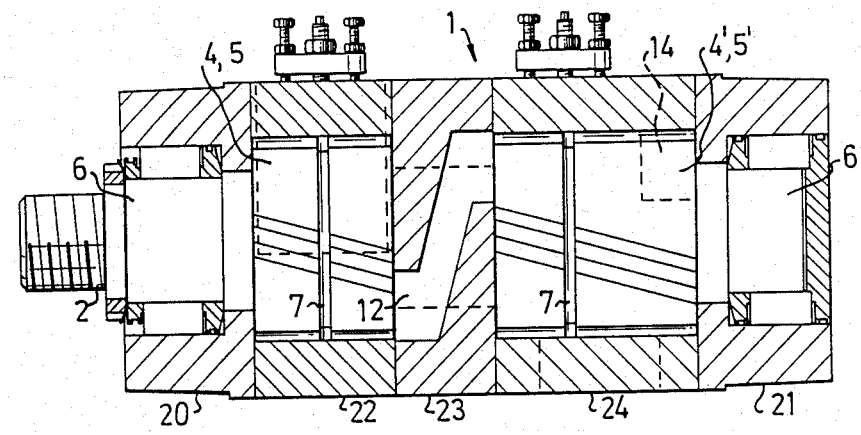
FIG. 1 is a vertical sectional view of a processing machine taken on the line indicated by the arrows I—I in FIG. 2.
Figure 2:
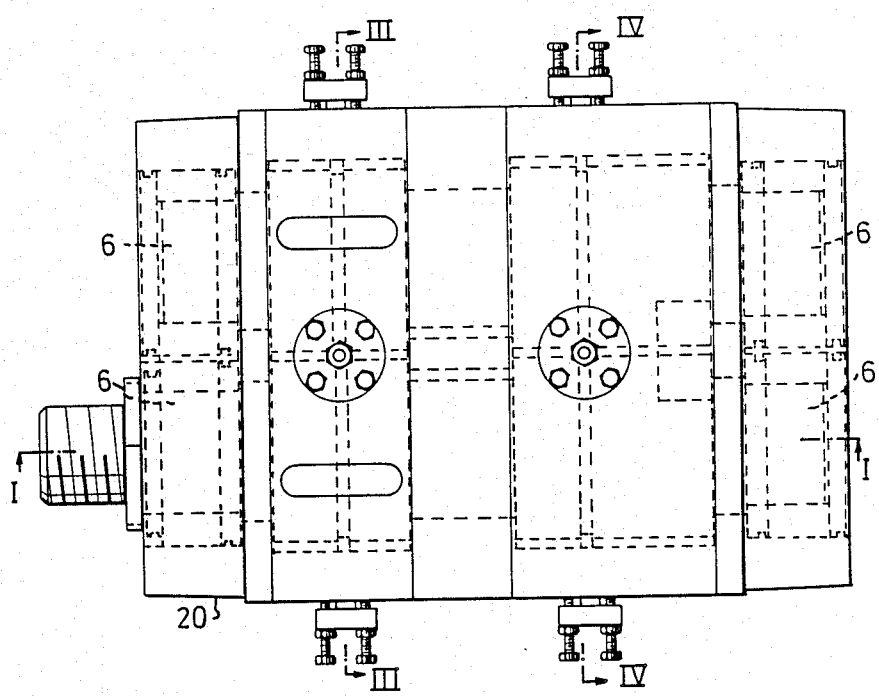
FIG. 2 is a plan view of the machine.
Figure 3:
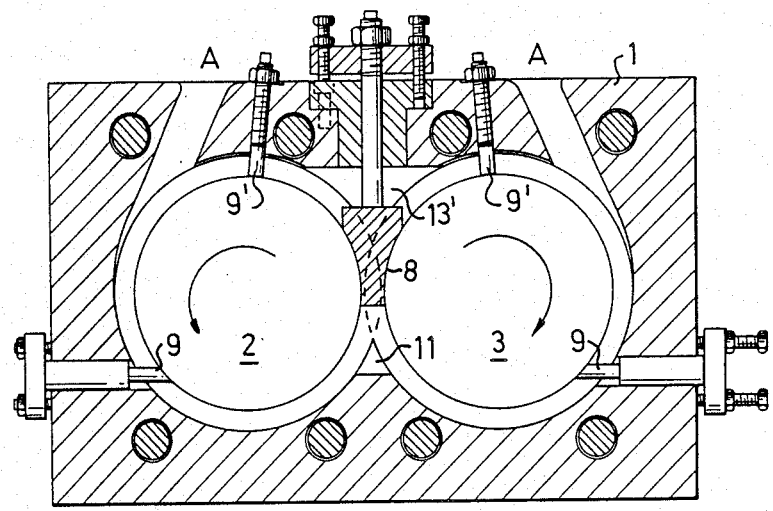
FIG. 3 is a sectional view taken on the line indicated by arrows III—III in FIG. 2.
Figure 4:
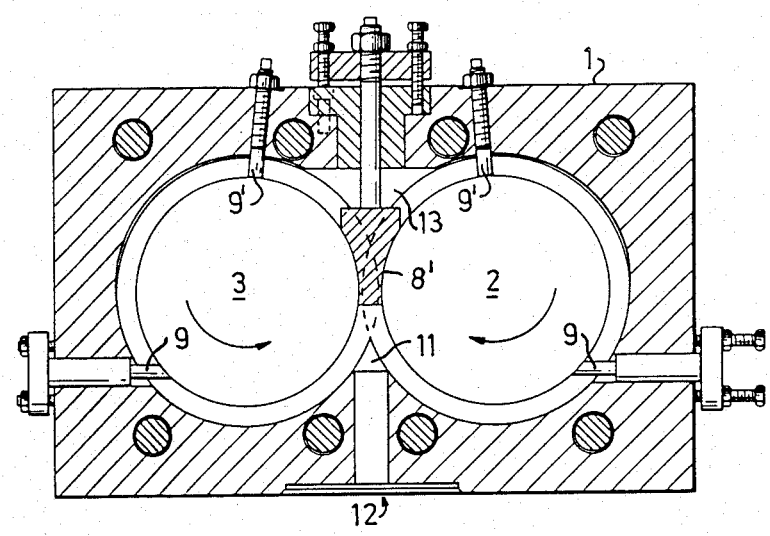
FIG. 4 is a corresponding sectional view taken on the line indicated by arrows IV—IV in FIG. 2.

Rubber or like material is introduced, for example in strip form, through the openings A (best seen in FIG. 3) and is cut into smaller pieces by the teeth of gears 4,5 against the wall of the housing 1, and is carried by the tooth spacings to the meshing points of respective gears, from whence it can be carried no further. The tongue 8 prevents the rubber from leaving through the opening formed by the grooves 7, and pressure will build up in the regions where the gears mesh.

The dividing means 9 force the severed rubber pieces into the tooth spacings, and the pressure prevailing at the gear meshing point will propagate rearwardly thereto via the grooves 7 in the gears.

A variation in the extent to which the rubber is worked can be achieved by moving the screws controlling the positions of the tongues 8 and the dividing device 9.

The rubber driven through the pump formed by the housing 1 and the gears 4 and 5 is collected in a pressurized cavity 11 located between the gears 4 and 5 upstream of the gear meshing point and driven from there through the inclined channel 12 to a space 13 above a further gear pair 4',5'. Here is no correspondence to the inlet holes A and B and the axially advanced rubber is fed via this latter gear pair in a second gear pump formed thereby. After the first gear pump, the rubber is transformed into a moldable or plastic mass which fills the spacings between the gear teeth. For the purpose of preventing the rubber from being conveyed axially too close to the shaft bearings, a filling piece 14 of approximate triangular configuration and having two cylindrical surfaces which adjoin the path of the gear stops is arranged in the distal part of the space 13'. Located in the region of the meshing point of the second gear pair on the undersides thereof is a space 11' in which the advanced rubber after a still further increase in pressure is collected and from which the rubber is discharged through an outlet 12. This outlet can be connected to various kinds of molding and shaping devices, such as extruders.

Initially the first gear pair merely cuts up the incoming rubber into smaller pieces filling the teeth interspacing, and the actual processing of the rubber takes place substantially after passing the dividing device 9. From the space 11 and onwards, however, the material will form a plastic or doughy mass which is further processed in the second gear pump under optimal forms. An additional processing effect can be obtained with the aid of controlled leakage achieved by adjusting the position of the dividing or parting device 9, the tongues 8 and 8' and the groove cleaning devices 9,9'. The groove cleaning devices prevent rubber from being entrained with the groove throughout consecutive revolutions to form a hard vulcanized layer thereon. The temperature of the rubber can be raised above the level obtained as a result of working the rubber in the gear pumps, by supplying heat through heating passages or electrical heating elements arranged in the housing 1. Such heating passages may also be provided in the aforesaid shafts. This provision has not been illustrated in the drawings for the sake of simplicity. The shafts may be heated with the aid of hot water or steam conducted through conduits connected to known swivel devices.

Figure 5:
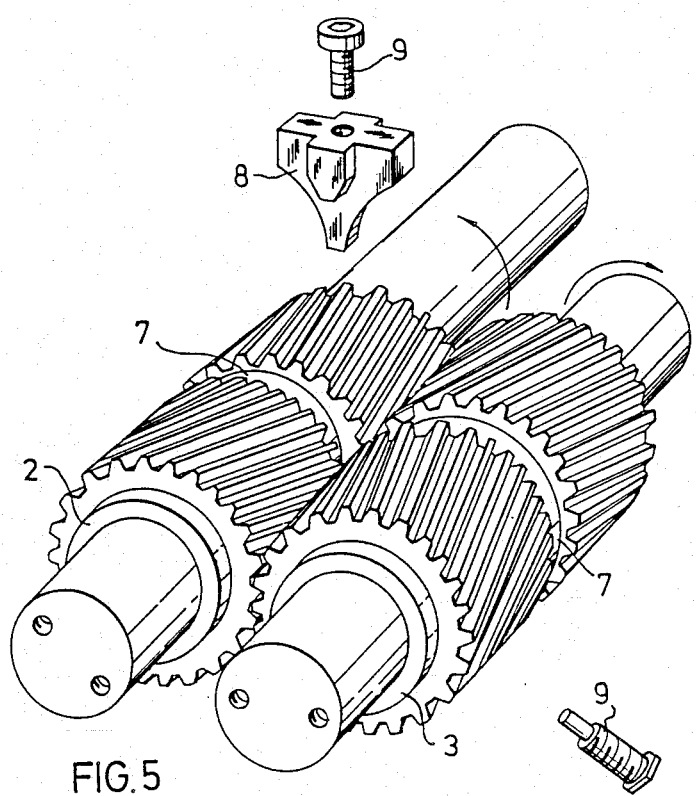
FIG. 5 illustrates the gears of a known gear pump.

Arranged at the ends of the gears facing outwardly towards respective bearings 6 are known scraper means (not shown), which are operative to prevent rubber from being forced into the bearings, and slots through which leaking rubber is pressed. In order to ensure against excessive leakage, the gear teeth are preferably angled in a manner such that the gear teeth first mesh at the ends facing the bearings. Although known types of gear forms are preferred, such as the gear design illustrated in FIG. 5 incorporating grooves 7 and inserted tongues, other gear forms which do not incorporate the grooves 7 and the tongues 8 may also be used. In this latter case, the gears are preferably of single helical configuration, e.g., helicoidal.

Figure 6:
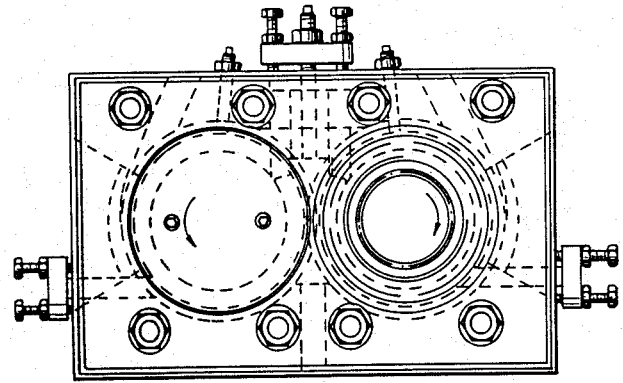
FIG. 6 is an end view of a machine constructed in accordance with the invention.

As already mentioned, the shafts 2 and 3 are preferably manufactured each in one piece. The housing 11 is constructed so that it can be parted along a center plane and is divided along its length to form bearing housings 20, 21 at the ends thereof, gear pump housing 22, 24, and a channel housing 23 located therebetween. These various housings are drawn together with the aid of tension rods, as shown by the end view in FIG. 6. The housings are provided with locating studs and corresponding holes, to facilitate accurate alignment of the housings when fitting the same together, all in a manner obvious to one skilled in this art.

Where the gear teeth of the first gear pair mesh, the processed mass will exert an upwardly acting force, which is propagated to a downwardly acting force at the upper side of the next gear pair, where it partially compensates a corresponding upwardly acting pressure force from the next gear mesh. This reduces the flexural stresses on the shafts 2 and 3. When necessary (depending primarily on the material being processed) and if bowing of the shafts is excessive, simple slide-bearing surfaces may be screwed from above into the channel housing 23, into contact with those parts of the shafts having no gear mounted thereon.

In a working embodiment, the gears had an outer radius of 100 mm and the motor developed a torque of 1200 kgm, resulting in radially acting pressure force between the teeth at the gear meshing point of 12 metric tons. It will be understood that the elastomeric mass can be worked extremely efficiently where the gears mesh, this effect being greatly amplified by using two (or more) gear pumps connected in series in accordance with the invention.

When manufacturing the gears it has been found possible simply to plane th gears, without grinding the same, since the surfaces of the gear teeth obtain an extremely good surface finish after having been in use for a short period of time.

As will be understood, the reference to rubber in the foregoing is not intended to limit the invention. The invention can be applied with all kinds of elastomers and like masses which are to be processed, injected or treated in like manner.

I claim:

1. Apparatus for processing elastomer products by means of a plurality of sequentially arranged gear pumps, comprising
   (a) only two parallel shafts journalled for rotation in a housing and provided with a first set of mutually opposing and meshing gears located in a first space in said housing;
   (b) an input aperture for introducing a said product into spaces between said gears and said housing;
   (c) guide channel means for guiding away elastomeric product passed through gear teeth interspacing into gear tooth engagement;
   (d) at least one further set of mutually opposing and meshing gears arranged on said only two shafts and axially displaced and mounted in a second space in said housing;
   (e) an oblique channel between said first space and said second space in said housing, said channel forming an angle with a plane common to both of said shafts and intersecting said plane to a point located between said shafts;
   (f) said guide channel means being arranged in the vicinity of a final meshing point of said gears, as seen in the direction of movement of said elastomeric product being processed.

2. Apparatus according to claim 1, wherein at least those parts of said gears which face outwardly toward bearings from a center of said apparatus have teeth which are inclined to cylinder generatrices of respective gears at an angle such that meshing of said gears commences at those tips of said gear teeth which face said bearings.

3. Apparatus according to claim 2, wherein said gears have a herringbone configuration.

4. Apparatus according to claim 1, wherein additional gear pairs are arranged on said only two parallel shafts, an oblique channel being arranged in said housing between each pair of said gears.

* * * * *